(12) United States Patent
Ohtsuka

(10) Patent No.: US 9,025,785 B2
(45) Date of Patent: May 5, 2015

(54) AUDIO RECORDING DEVICE AND IMAGING DEVICE

(75) Inventor: Yoshio Ohtsuka, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 381 days.

(21) Appl. No.: 13/520,920

(22) PCT Filed: Feb. 15, 2011

(86) PCT No.: PCT/JP2011/000833
§ 371 (c)(1),
(2), (4) Date: Jul. 6, 2012

(87) PCT Pub. No.: WO2012/035675
PCT Pub. Date: Mar. 22, 2012

(65) Prior Publication Data
US 2012/0281112 A1 Nov. 8, 2012

(30) Foreign Application Priority Data
Sep. 16, 2010 (JP) ................. 2010-207507

(51) Int. Cl.
*H04R 29/00* (2006.01)
*G03B 31/00* (2006.01)
*G03B 17/56* (2006.01)

(52) U.S. Cl.
CPC .............. *H04R 29/008* (2013.01); *G03B 31/00* (2013.01); *H04R 29/004* (2013.01); *H04R 2499/11* (2013.01); *G03B 17/568* (2013.01)

(58) Field of Classification Search
CPC .............. H04R 29/00; H04R 3/00; H03G 3/00
USPC .............. 381/56, 58, 80–81, 122, 77; 700/94
See application file for complete search history.

(56) References Cited

U.S. PATENT DOCUMENTS

| | | | |
|---|---|---|---|
| 7,119,267 B2 * | 10/2006 | Hirade et al. | 84/602 |
| 7,187,775 B2 * | 3/2007 | Fujita | 381/111 |
| 7,728,874 B2 | 6/2010 | Sekiguchi et al. | |
| 2004/0101144 A1 * | 5/2004 | Lee | 381/58 |
| 2006/0023081 A1 | 2/2006 | Sekiguchi et al. | |
| 2011/0095876 A1 * | 4/2011 | Tanaka | 340/407.1 |

FOREIGN PATENT DOCUMENTS

| | | |
|---|---|---|
| JP | 3-171895 | 7/1991 |
| JP | 11-177864 | 7/1999 |
| JP | 2001-119774 | 4/2001 |
| JP | 2001-326989 | 11/2001 |
| JP | 2006-042271 | 2/2006 |
| JP | 2006-080634 | 3/2006 |

OTHER PUBLICATIONS

International Search Report of PCT Application No. PCT/JP2011/000833, dated Apr. 19, 2011.

\* cited by examiner

*Primary Examiner* — Disler Paul
(74) *Attorney, Agent, or Firm* — Panasonic Patent Center

(57) ABSTRACT

An audio recording device comprises an audio input unit, a detect unit, and a control unit. The audio input unit includes a connection unit and an audio receive unit. The connection unit is configured to connect with an external pickup device. The audio receive unit is configured to receive the input of an audio signal from the pickup device. The detect unit is configured to detect the connection between the connection unit and the pickup device. The control unit is configured to display information indicating the input state of the audio signal from the pickup device in response to detection of the connection between the connection unit and the pickup device by the detect unit.

7 Claims, 7 Drawing Sheets

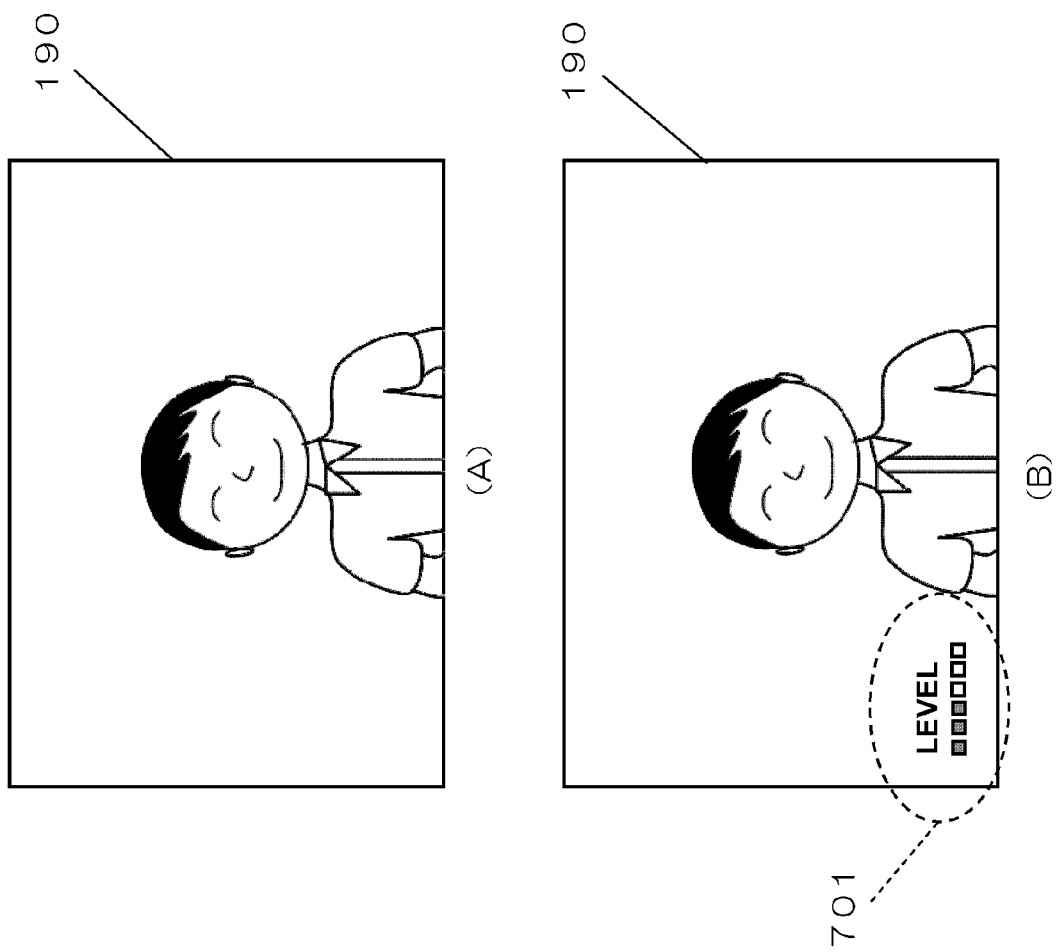

AUDIO RECORDING DEVICE AND IMAGING DEVICE

CROSS-REFERENCE TO RELATED APPLICATIONS

This U.S. National stage application claims priority under 35 U.S.C. §119(a) to Japanese Patent Application No. 2010-207507, filed in Japan on Sep. 16, 2010, the entire contents of which are hereby incorporated herein by reference.

TECHNICAL FIELD

The technology disclosed herein relates to an audio recording device that allows an external microphone to be connected and an imaging device that includes the audio recording device.

BACKGROUND ART

There are known audio recording devices to which an external microphone can be connected and with which sound can be picked up by an external microphone. With an audio recording device such as this, a constitution for preventing the user from forgetting to plug in the external microphone has been disclosed in Patent Literature 1.

With this conventional audio recording device, whether or not the plug of an external microphone has been inserted into the microphone jack of the audio recording device is detected, and if it has not been inserted, a notice to that information is display on the viewfinder of the audio recording device. This constitution prevents the user from trying to recording audio when the external microphone has not yet been hooked up.

CITATION LIST

Patent Literature

Patent Literature 1: Japanese Laid-Open Patent Application H11-177864

SUMMARY

Technical Problem

With a conventional audio recording device such as this, even though the user confirms that the external microphone has been connected, the user cannot confirm that the device is not in a state that allows sound pickup due to some problem with the external microphone. For example, if the external microphone is battery powered and this battery has died, the external microphone is not able to pick up sound. Also, a battery powered external microphone may be equipped with a power switch in order to extend battery life, and the user may forget to turn on the power switch. If this happens, even though the plug of the external microphone is connected to the audio recording device, the external microphone is not able to pick up sound. Thus, with a conventional audio recording device, the user could not confirm whether the audio recording device was in such a state.

It is an object of the technology disclosed herein to provide an audio recording device with which the user can accurately confirm that sound can be picked up with an external microphone.

Technical Solution

The audio recording device disclosed herein comprises an audio input unit, a detect unit, and a control unit. The audio input unit includes a connection unit and an audio receive unit. The connection unit is configured to connect with an external pickup device. The audio receive unit is configured to receive the input of an audio signal from the pickup device. The detect unit is configured to detect the connection between the connection unit and the pickup device. The control unit is configured to display information indicating the input state of the audio signal from the pickup device in response to detection of the connection between the connection unit and the pickup device by the detect unit.

Advantageous Effects

With the technology disclosed herein, the user can accurately confirm that the audio recording device is in a state in which sound can be picked up with an external microphone.

BRIEF DESCRIPTION OF DRAWINGS

Referring now to the attached drawings, which form a part of this original disclosure:

FIG. 7 is a diagram of what is displayed on a display component 190 pertaining to Embodiment 1.

DESCRIPTION OF EMBODIMENTS

Embodiment 1

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

The digital camera 100 according to Embodiment 1 comprises an internal microphone 111, and a jack 203 to which an external microphone 300 is connected. The digital camera 100 picks up sound with either the internal microphone 111 or the external microphone 300, and performs audio recording. The configuration and operation of the digital camera 100 will now be described.

1. Configuration

The configuration of the digital camera 100 will now be described through reference to the drawings.

1-1. Configuration of Digital Camera 100

Figure 1:
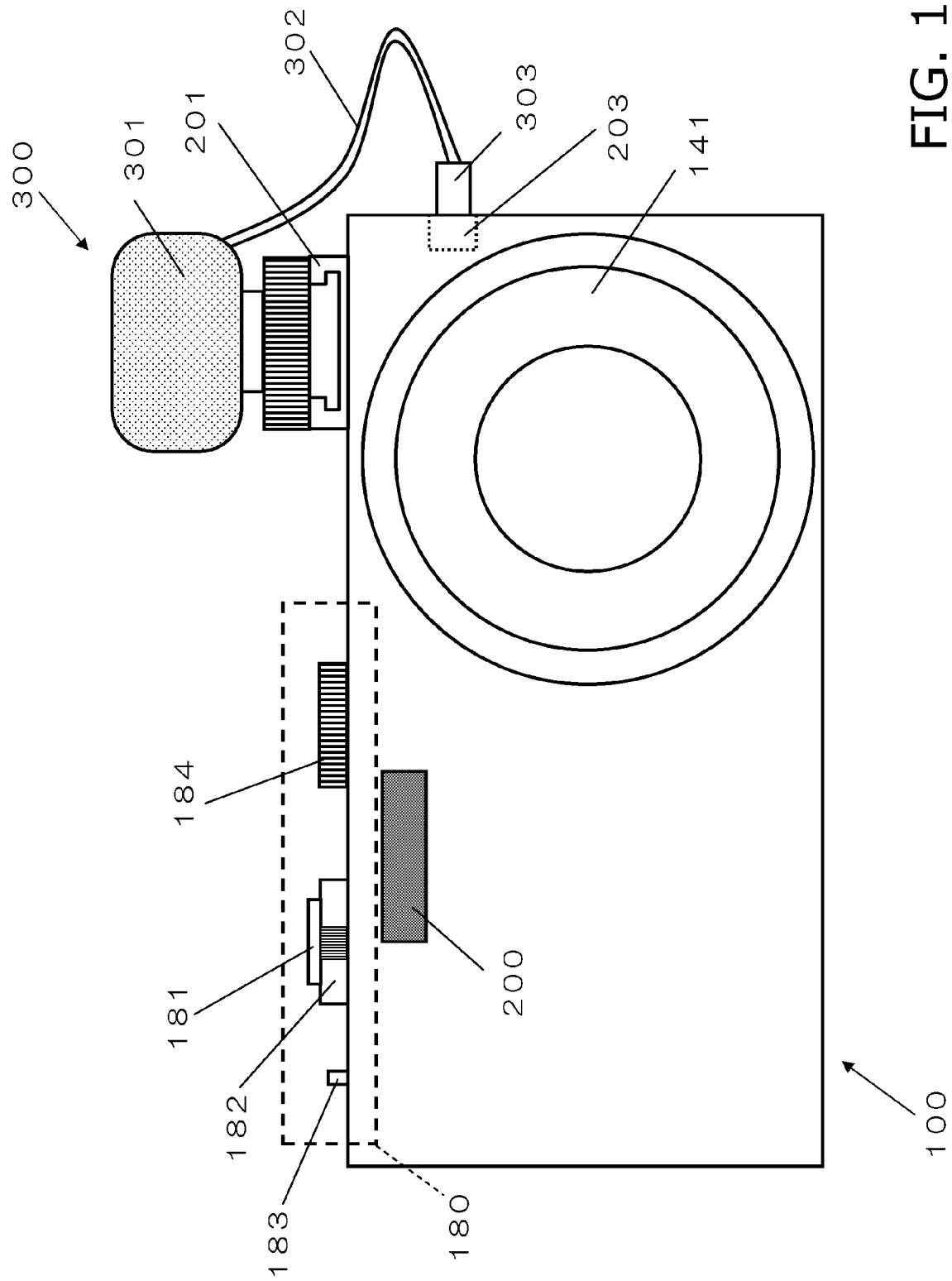
FIG. 1 is a front view of a digital camera 100 pertaining to Embodiment 1.

FIG. 1 is a front view of the digital camera 100. The digital camera 100 comprises a lens barrel 141 and a flash 200 on its front face. The digital camera 100 comprises manipulation components 180 such as a release button 181, a zoom lever 182, a power switch 183, and a mode dial 184, and a shoe 201 on its top face. The external microphone 300 can be mechanically and electrically connected to the digital camera 100. The shoe 201 allows the external microphone 300 to be mechanically fixed. The external microphone 300 comprises a pickup component 301, a cable 302 linked to the pickup component 301, and a plug 303 linked to the cable 302. The plug 303 can be electrically connected with the jack 203, which the digital camera 100 has on a side face. An audio signal picked up by the pickup component 301 of the external microphone 300 goes through the cable 302, the plug 303, and the jack 203 and is inputted to audio processors 115 and 120, etc., of the digital camera 100.

Figure 2:
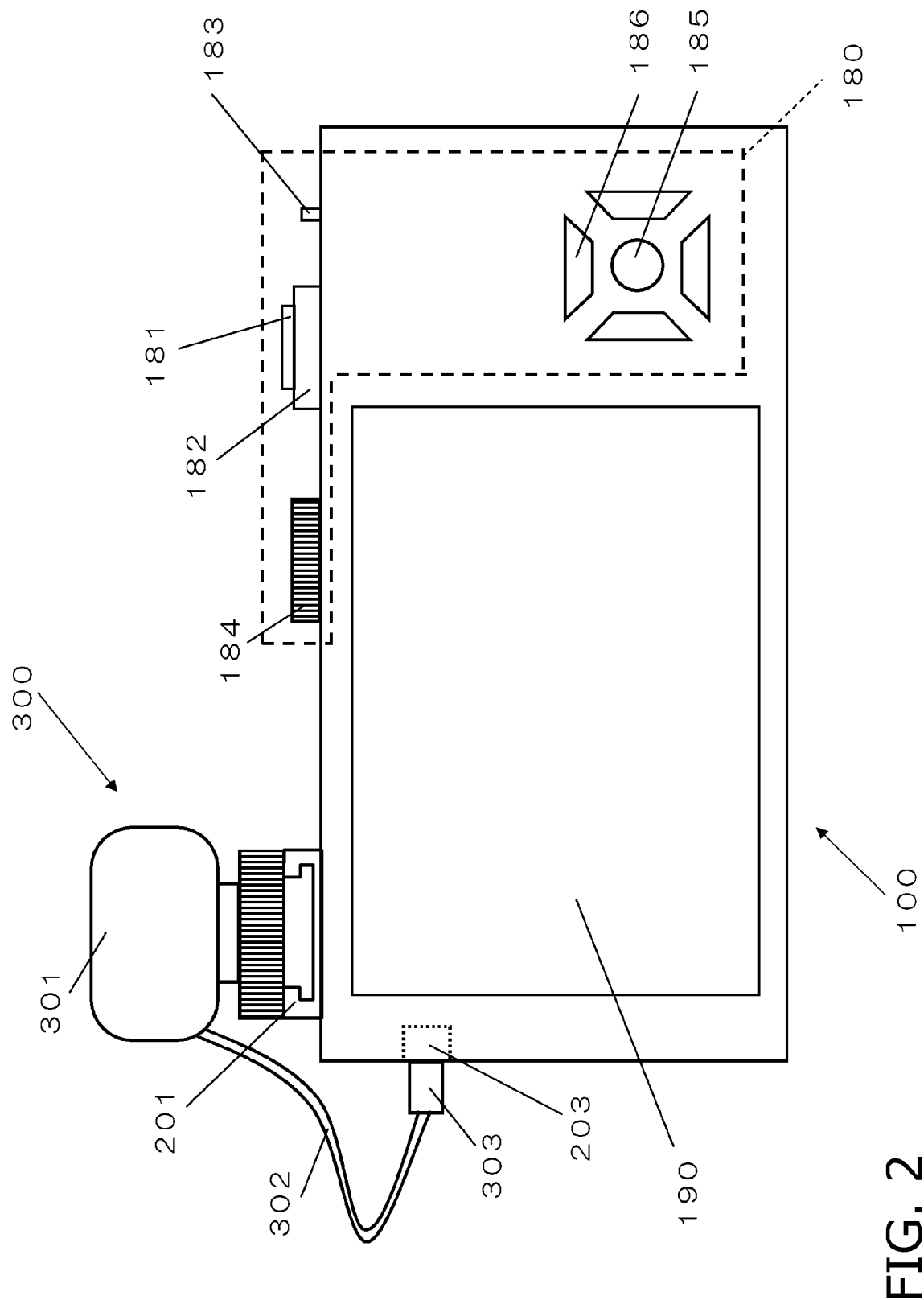
FIG. 2 is a rear view of the digital camera 100 pertaining to Embodiment 1.

FIG. 2 is a rear view of the digital camera 100. The digital camera 100 comprises manipulation components 180 such as a center button 185, and a cross key 186, and a display component 190 on its rear face.

Figure 3:
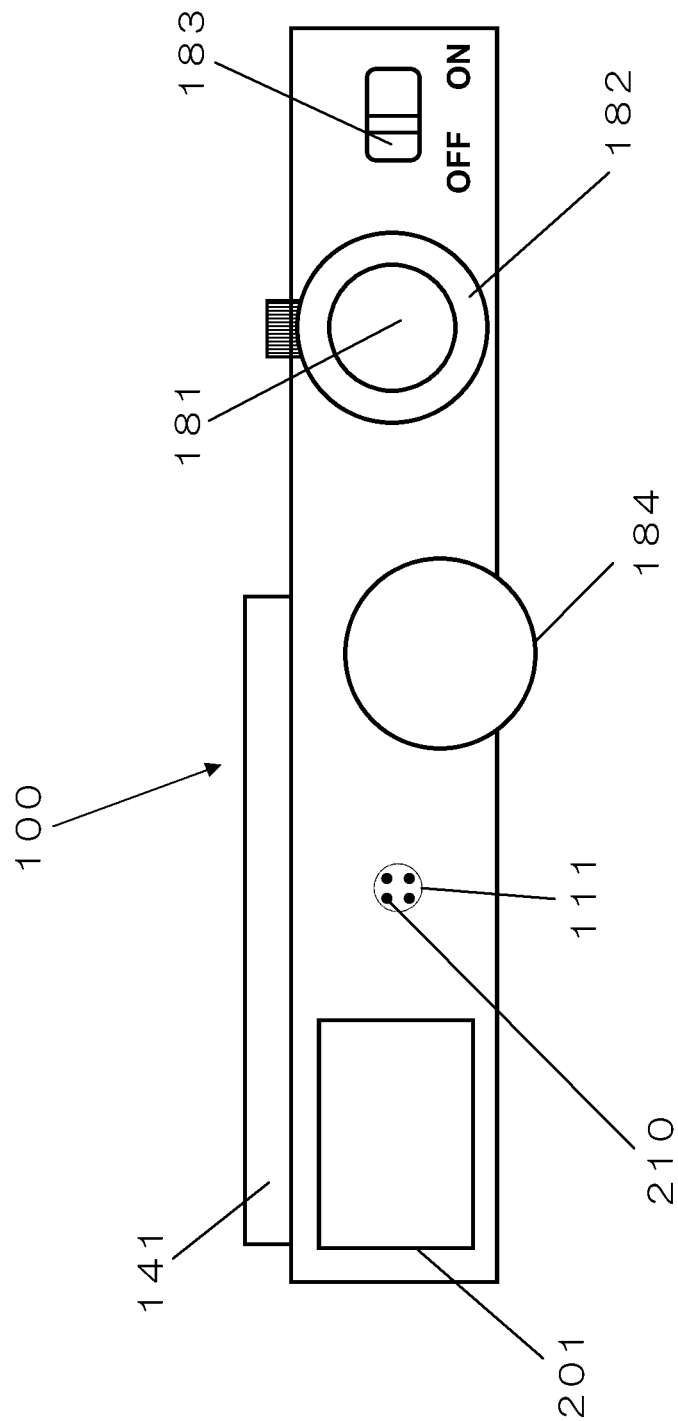
FIG. 3 is a top view of the digital camera 100 pertaining to Embodiment 1.

FIG. 3 is a top view of the digital camera 100. The digital camera 100 comprises microphone holes 210 on its top face. The digital camera 100 also comprises the internal microphone 111 at the lower part of the microphone holes 210.

Figure 4:
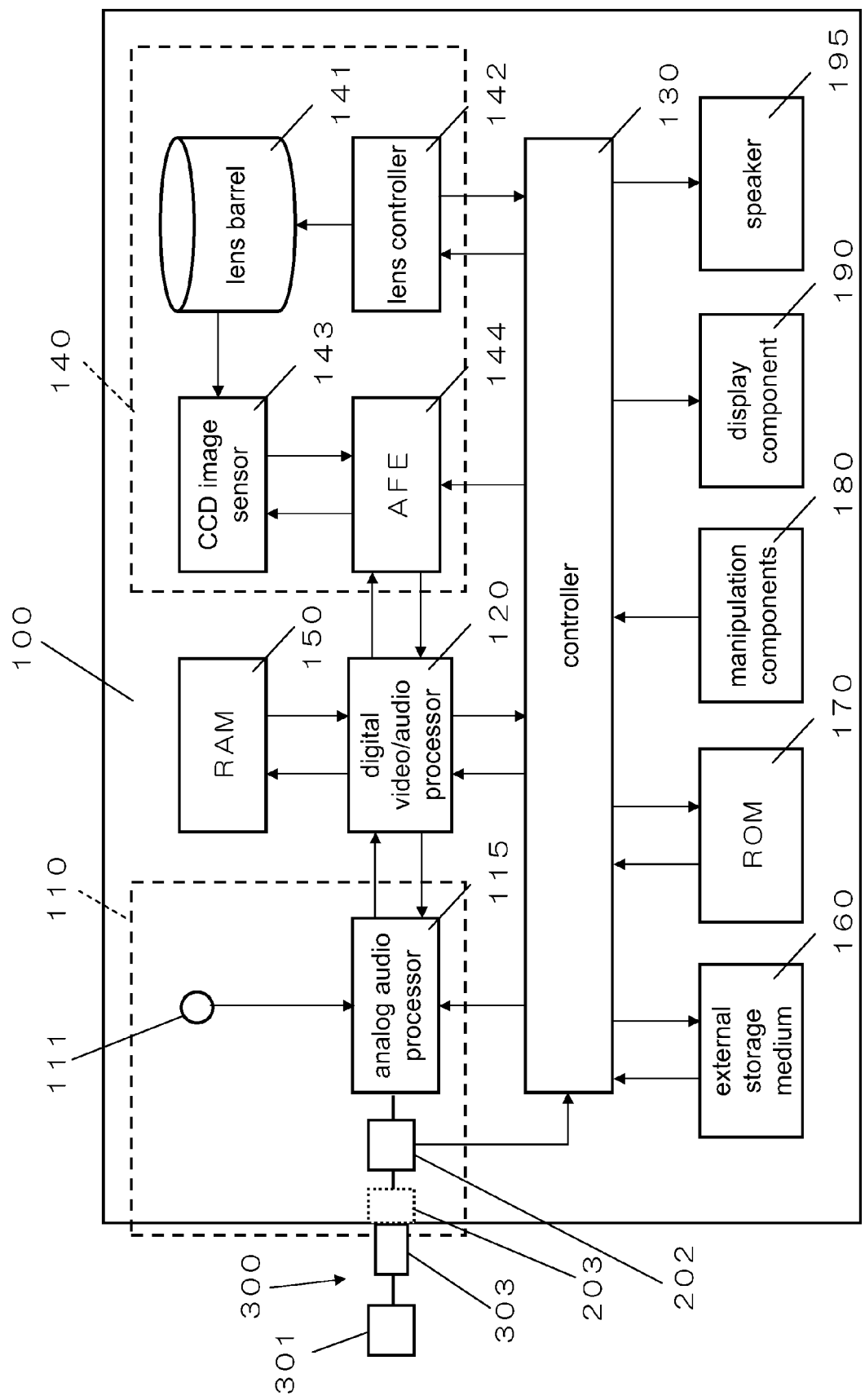
FIG. 4 is a block diagram of the electrical configuration of the digital camera 100 pertaining to Embodiment 1.

FIG. 4 is a block diagram of the electrical configuration of the digital camera 100. The digital camera 100 comprises an image input system 140, an audio input system 110, a digital video/audio processor 120, a controller 130, a RAM 150, an external storage medium 160, a ROM 170, the manipulation components 180, the display component 190, and a speaker 195.

The digital camera 100 produces image information and audio signals from information obtained externally. The image information is produced by the image input system 140. The audio signals are produced by the audio input system 110. The image information and audio signals that are produced are subjected to A/D conversion and variously processed by the digital video/audio processor 120, after which they are recorded to the external storage medium 160, which is a memory card or the like. The image information recorded to the external storage medium 160 is displayed on the display component 190 when the user operates the manipulation components 180. The audio signals recorded to the external storage medium 160 are outputted from the speaker 195 when the user operates the manipulation components 180.

The various components shown in FIGS. 1 to 4 will now be described in detail.

The image input system 140 comprises the lens barrel 141, a lens controller 142, a CCD image sensor 143, and an AFE (analog front end) 144.

The lens barrel 141 is an optical system having a plurality of lenses. The lens barrel 141 forms a subject image by performing subject focus adjustment, image angle adjustment, incident light flux adjustment, shake correction, and so forth with a motor driven according to a control signal from the lens controller 142.

The CCD image sensor 143 produces image information by capturing the subject image formed through the lens barrel 141. A plurality of photodiodes are arranged in a matrix on the light receiving face of the CCD image sensor 143. R, and B primary color filters are arranged to correspond to these photodiodes. The R, and B primary color filters are arranged in a predetermined layout structure. Light from the subject that is a target passes through the lens barrel 141, after which an image is formed on the light receiving face of the CCD image sensor 143. The subject image thus formed is converted into color information which is divided up into R, and B according to the light flux incident on the photodiodes. As a result, image information indicating the entire subject image is produced. Each of photodiodes corresponds to pixels of the CCD image sensor 143. However, the color information that is actually outputted from the photodiodes is primary color information of either R, or G. Accordingly, the color that is to be expressed by each pixel is produced on the basis of the primary color information (color and light flux) outputted from the photodiode corresponding to that pixel and from its surrounding photodiodes. The CCD image sensor 143 can also produce image information for a new frame at predetermined time intervals when the digital camera 100 is in imaging mode.

The AFE 144 subjects the image information read from the CCD image sensor 143 to noise suppression by correlated double sampling, to amplification to the input range width of an A/D converter with an analog gain controller, and to A/D conversion with an A/D converter. After this, the AFE 144 outputs the image information to the digital video/audio processor 120.

The audio input system 110 comprises the internal microphone 111, the jack 203, a detector 202, and the analog audio processor 115. The detector 202 detects whether or not the plug 303 of the external microphone 300 has been connected to the jack 203. This detection may be accomplished either mechanically or electrically. With a mechanical method, for example, if the plug 303 is connected to the jack 203, the detector 202 detects that the distal end of the plug 303 has pressed down a switch. With an electrical method, for example, special wiring is readied so that the electrical resistance will vary depending on whether or not the plug 303 is connected to the jack 203, and the detector 202 detects this electrical resistance. If the detector 202 detects that the plug 303 has been connected to the jack 203, the analog audio processor 115 preferentially selects and processes the input of the external microphone 300 over the input of the internal microphone 111. On the other hand, if the detector 202 detects that the plug 303 has not been connected to the jack 203, the analog audio processor 115 processes the input of the internal microphone 111. That is, with the digital camera 100, while the external microphone 300 is connected, sound pickup is performed with the external microphone 300, but if the external microphone 300 is not connected, sound pickup is performed with the internal microphone 111. Therefore, the analog audio processor 115 can receive the input of audio signals from the external microphone 300 and the internal microphone 111, but if the timing is the same, only the audio signal from either the external microphone 300 or the internal microphone 111 is processed.

The analog audio processor 115 subjects the processed audio signal to A/D conversion with the A/D converter, and outputs the result to the digital video/audio processor 120.

The digital video/audio processor 120 performs various kinds of processing on the image information outputted from the AFE 144 and the audio signal outputted from the analog audio processor 115. For instance, the digital video/audio processor 120 subjects the image information to gamma correction, white balance correction, scratch correction, encoding processing, and the like according to instructions from the controller 130. Also, the digital video/audio processor 120 subjects the audio signal to various processing according to instructions from the controller 130. The digital video/audio processor 120 may consist of a hard-wired electronic circuit, or may consist of a microprocessor or the like that executes programs. The digital video/audio processor 120 may also be a single semiconductor chip that is integrated with the controller 130, etc.

The display component 190 is disposed on the rear face of the digital camera 100. In this embodiment, the display component 190 is a liquid crystal display. The display component 190 displays an image based on the image information processed by the digital video/audio processor 120. Images displayed by the display component 190 include through-images, reproduced images, and so forth. A through-image is one frame of image newly and continuously produced at predetermined time intervals by the CCD image sensor 143.

Usually, when the digital camera 100 is set to imaging mode, and when it is in a standby state (not performing still picture imaging) or in a moving picture imaging state, the digital video/audio processor 120 produces a through-image from the image information produced by the CCD image sensor 143. The user can refer to the through-image displayed on the display component 190 to capture a subject image while checking on the subject composition. When the digital camera 100 is in reproduction mode, a reproduced image is produced by the digital video/audio processor 120. A reproduced image is an image obtained by reducing a high-resolution image recorded to the external storage medium 160, etc., to a lower pixel count that matches the size of the display component 190. The high-resolution image information recorded to the external storage medium 160 is produced by the digital video/audio processor 120 on the basis of the image information produced by the CCD image sensor 143 after the user has operated the release button 181. The speaker 195 outputs the audio signal recorded to the external storage medium 160.

Also, the display component 190 is able to display on a level meter 701 (see FIG. 7). The level meter 701 shows in real time the audio level of the audio signal picked up by the internal microphone 111 or the external microphone 300, as information indicating the input state of the audio signal picked up by the internal microphone 111 or the external microphone 300. The "audio level" corresponds to the magnitude (volume) of the audio.

The controller 130 performs overall control of the operation of the entire digital camera 100.

The ROM 170 stores programs for overall control of the operation of the entire digital camera 100, as well as programs related to auto-focus control (AF control), auto-exposure control (AE control), emission control of the flash 200, and so forth. These programs are executed by the controller 130.

The ROM 170 also stores various settings related to the digital camera 100, including a setting for selecting the display of the audio level (a setting for selecting whether or not to display the level meter 701). In this embodiment, the ROM 170 is a flash ROM.

The controller 130 may consist of a hard-wired electronic circuit, or may consist of a microprocessor or the like that executes programs. The controller 130 may also consist of a single semiconductor chip that is integrated with the digital video/audio processor 120, etc. Also, the ROM 170 does not need to be present outside of the controller 130 (separate from the controller 130), and may instead be incorporated into the interior of the controller 130.

The RAM 150 functions as a working memory for the digital video/audio processor 120 and the controller 130. The RAM 150 can be an SDRAM, a flash memory, or the like. The RAM 150 can also function as an internal memory for recording image information, audio signals, and so forth.

The external storage medium 160 is an external memory that is internally equipped with a nonvolatile recording component, such as a flash memory. The external storage medium 160 is able to record data such as audio signals and image information processed by the digital video/audio processor 120.

The "manipulation components 180" is the collective name given to the manipulation interface such as buttons or dials disposed on the outside of the digital camera 100. The manipulation components 180 are operated by the user. For example, these include the release button 181, the zoom lever 182, the power switch 183, the mode dial 184, the center button 185, the cross key 186, and so forth, as shown in FIGS. 1, 2, and 3. The manipulation components 180 issue signals directing various operations to the controller 130 when operated by the user.

The release button 181 is a push button that operates in two stages, namely, a half-pressed state and a fully pressed state. When the release button 181 is pressed halfway down by the user, the controller 130 executes AF (auto-focus) control and/or AE (auto-exposure) control, etc., and determines the imaging conditions. In AF control, the digital video/audio processor 120 calculates a contrast value in a predetermined region of the video information, the controller 130 drives the lens barrel 141 through the lens controller 142 on the basis of this calculation, and feedback control is performed so that the contrast value is at its maximum. As a result of AF control, the controller 130 obtains a focal distance from the digital camera 100 to the subject that is to undergo AF control. Also, as a result of AF control, the lens barrel 141 images the subject that is to undergo AF control on the CCD image sensor 143. When the user then presses the release button 181 all the way down, the controller 130 records to the external storage medium 160 etc., the image information captured at the timing of the full depression of the button.

The zoom lever 182 is a lever having a wide angle end and a telephoto end for image angle adjustment. The zoom lever 182 is a self-returning lever that automatically returns to its center position when released by the user. When operated by the user, the zoom lever 182 issues a signal instructing the controller 130 to drive the lens barrel 141. Specifically, when the user moves the zoom lever 182 to the wide angle side, the controller 130 drives the lens barrel 141 via the lens controller 142 so that the subject image is captured at a wide angle. Similarly, when the user moves the zoom lever 182 to the telephoto side, the controller 130 drives the lens barrel 141 via the lens controller 142 so that the subject image is captured in telephoto.

The power switch 183 is a sliding switch for switching the power supply on or off to the various components of the digital camera 100. When the power is off and the user slides the power switch 183 to the right, the controller 130 supplies power to the various components of the digital camera 100 and actuates these components. When the power is on and the user slides the power switch 183 to the left, the controller 130 shuts off the supply of power to the various components of the digital camera 100.

The mode dial 184 is a rotary dial. When the mode dial 184 is turned by the user, the controller 130 switches the operating mode of the digital camera 100 to the operating mode corresponding to the current rotational position of the mode dial 184. Operating modes include, for example, auto-imaging mode, manual imaging mode, scene selection mode, and reproduction mode. Herein, the auto-imaging mode, manual imaging mode, scene selection mode, and reproduction mode will be collectively referred to as the imaging mode.

The center button 185 is a push button. When the digital camera 100 is in imaging mode or reproduction mode and the user presses the center button 185, the controller 130 displays a menu screen on the display component 190. A "menu screen" is a screen used by the user for setting various imaging conditions and reproduction conditions. When the center button 185 is pressed in a state in which the user has selected a value for a setting category of a certain condition on the menu screen, that setting category is set to that value. The setting thus selected is stored in the ROM 170.

The cross key 186 comprises four push buttons which include a top button, a bottom button, a left button, and a right button. The user presses one of these buttons of the cross key 186 in order to select the value of a setting category for a certain condition displayed on the menu screen.

The flash 200 comprises a xenon tube, a capacitor, a step-up circuit, and a light emission trigger circuit. The step-up circuit applies high voltage to the capacitor according to a control signal from the controller 130. The light emission trigger circuit discharges high voltage to the charged capacitor according to a control signal from the controller 130, and instantly flashes light in the xenon gas held inside the xenon tube. The light emission trigger circuit discharges the high voltage of the capacitor in synchronization with the imaging. Consequently, the digital camera 100 can image the subject which has received light. Specifically, the flash 200 instantly emits light during the imaging of the subject, and the additional light is provide for the subject. Light emission by the flash 200 includes pre-emission and main emission light. The pre-emission light is used prior to imaging. The pre-emission light is used to determine the distance to the subject on the basis of the amount of reflection from the subject produced by the flash light, and find the amount of light to be emitted by the flash 200 during imaging according to this determination. The main emission executed in synchronization with the timing of the imaging according to the amount of light emission found by pre-emission.

1-2. Correlation with the Present Invention

The external microphone 300 is an example of the external pickup device. The jack 203 is an example of the connection unit. The analog audio processor 115 is an example of the audio receive unit. The audio input system 110 is an example of the audio input unit. The detector 202 is an example of the detect unit. The controller 130 is an example of the control unit. The level meter 701 is an example of the information indicating the input state of the audio signal from the pickup device. The internal microphone 111 is an example of the built-in pickup unit. The manipulation components 180 are an example of the setting unit. The display component 190 is an example of the display unit. And the digital camera 100 is an example of the audio recording device.

2. Operation

Next, the operation of the digital camera 100 in imaging mode pertaining to Embodiment 1 will now be described. The digital camera 100 displays a through-image on the display component 190 in a standby state in imaging mode or in a moving picture imaging state in moving picture imaging. When the external microphone 300 has been connected, the digital camera 100 displays the level meter 701, which is information indicating the audio level of the audio signal picked up by the external microphone 300, regardless of the setting for selecting and displaying the audio level (the setting for selecting whether or not to display on the level meter 701). On the other hand, when the external microphone 300 has not been connected, the digital camera 100 displays the level meter 701, which is information indicating the audio level of the audio signal picked up by the internal microphone 111, according to the setting for selecting and displaying the audio level. In the following description, the flow of the overall operation during imaging mode will first be described through reference to FIGS. 5 to 7, and then the flow of operation in monitor display will be described, and then what is displayed on the display component 190 will be described.

Figure 5:
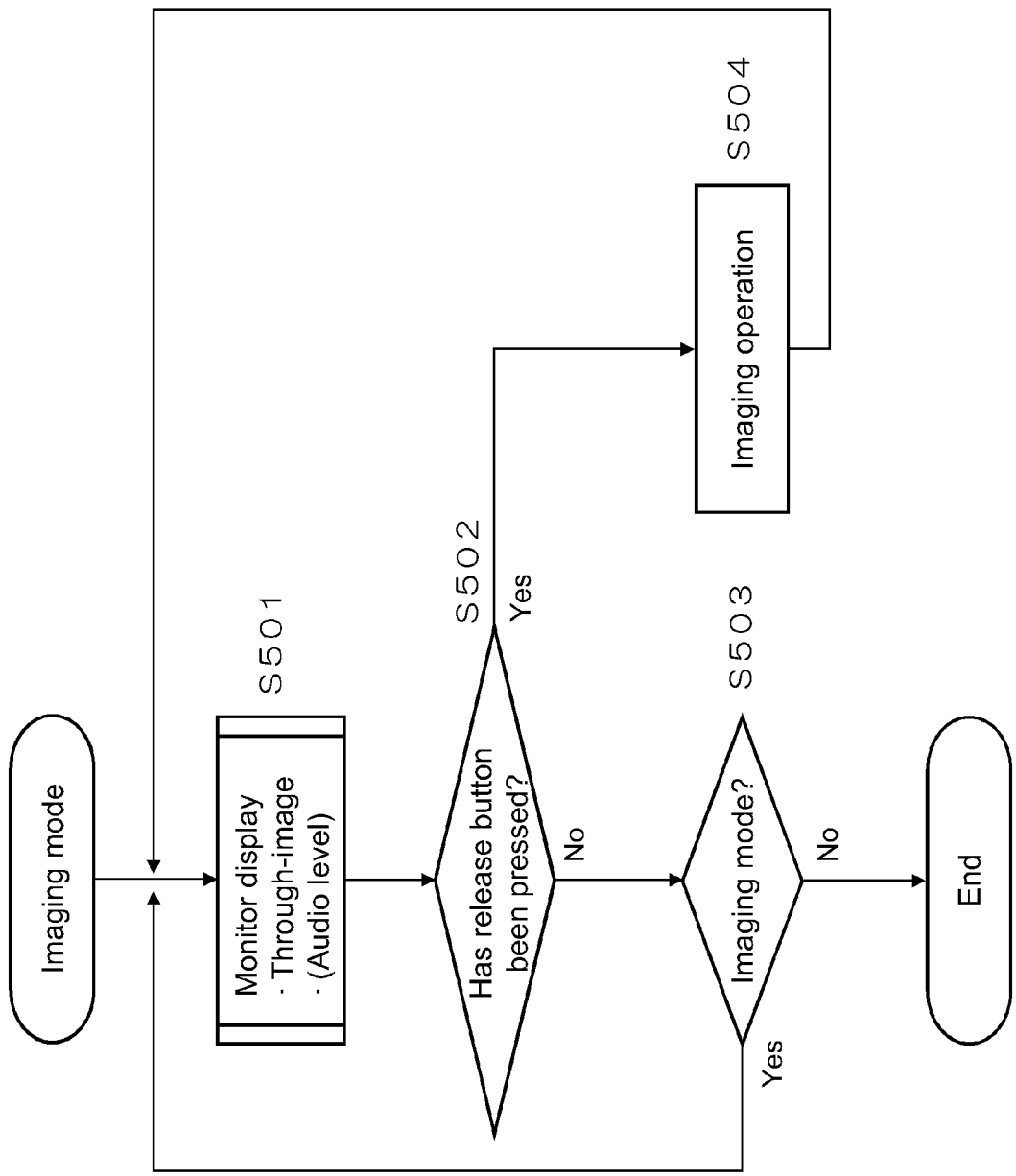
FIG. 5 is a flowchart of the operation in imaging mode of the digital camera 100 pertaining to Embodiment 1.

FIG. 5 is a flowchart of the overall operation of the digital camera 100 in imaging mode. When the power switch 183 is operated to turn on the power, the digital camera 100 enters moving picture imaging mode. The digital camera 100 also enters imaging mode when the mode dial 184 is operated to issue a command to switch from reproduction mode to imaging mode. Once imaging mode is entered, the processing shown in FIG. 5 starts. In step S501, the controller 130 displays the through-image outputted by the digital video/audio processor 120 on the display component 190. Also, the controller 130 determines the audio level of the audio signal outputted by the digital video/audio processor 120, and displays the level meter 701 indicating the audio level on the display component 190, as needed. The "audio level" referred to here is the audio level of the audio signal picked up by the internal microphone 111 or the external microphone 300. That is, the controller 130 decides the input state of the audio signal inputted to the analog audio processor 115 via the internal microphone 111 or the external microphone 300. The operation of monitor display in step S501 will be discussed in detail below. Next, in step S502, the controller 130 determines whether or not the release button 181 has been pressed. If it is decided in step S502 that the release button 181 has been pressed, the imaging operation of step S504 is executed. If it is decided in step S502 that the release button 181 has not been pressed, the imaging mode is determined in step S503. In step S503, the controller 130 determines whether or not the current operating mode is the imaging mode. If the operating mode is determined to be the imaging mode in step S503, the flow returns to step S501, which is the starting point for operation in imaging mode. If the operating mode is determined not to be the imaging mode in step S503, the operation in imaging mode is ended.

Figure 6:
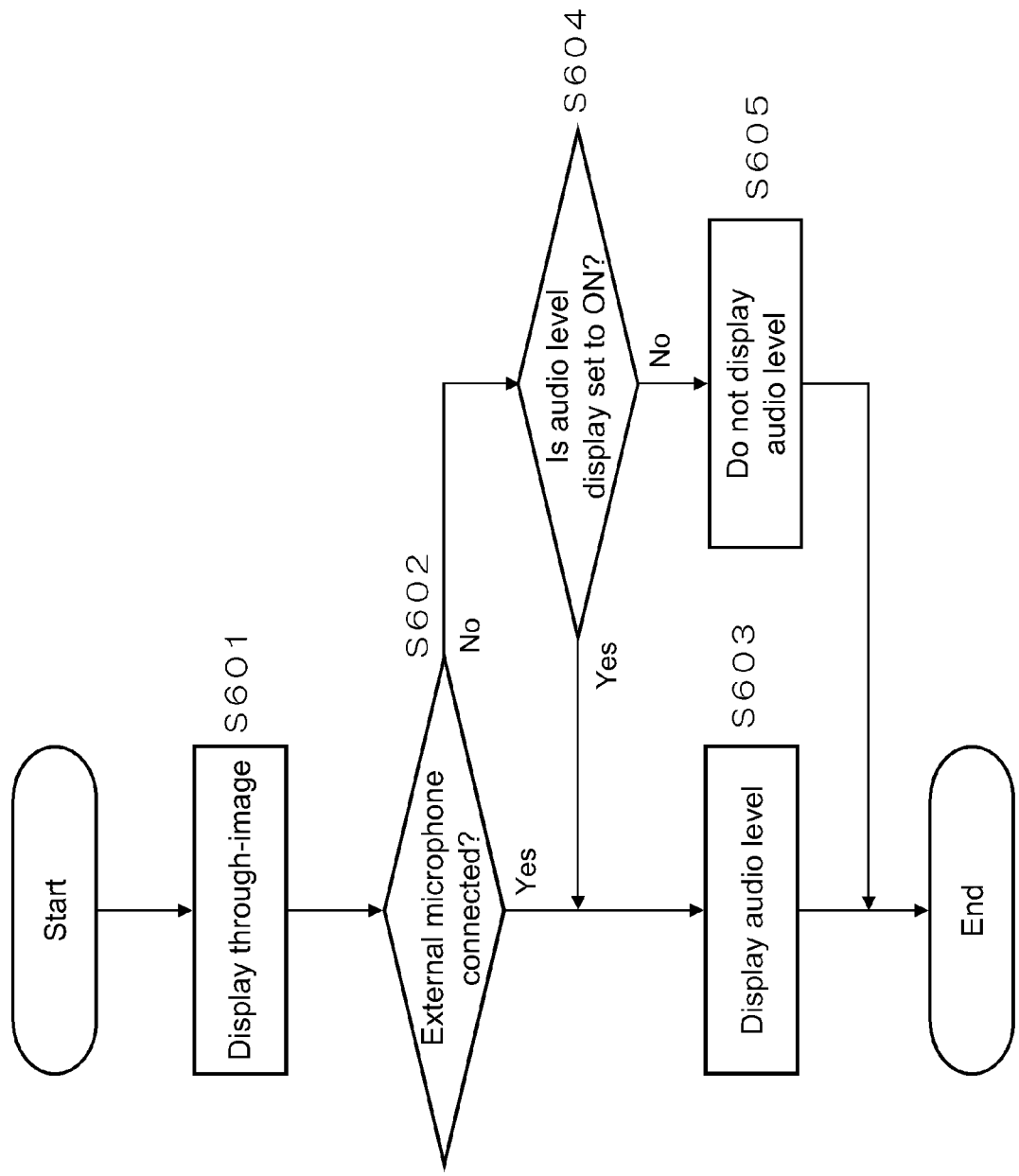
FIG. 6 is a flowchart of the operation of monitor display of the digital camera 100 pertaining to Embodiment 1.

FIG. 6 is a flowchart of the operation of monitor display discussed in the flowchart in FIG. 5 (step S501). In step S601, the controller 130 displays on the display component 190 the through-image outputted by the digital video/audio processor 120. In step S602, the controller 130 determines from the detection result of the detector 202 whether or not the plug 303 of the external microphone 300 has been connected to the jack 203. If it is determined in step S602 that the plug 303 has been connected to the jack 203, that is, that the external microphone 300 has been connected to the digital camera 100, then step S603 is executed. As discussed above, when the detector 202 detects that the plug 303 has been connected to the jack 203, the analog audio processor 115 preferentially selects and processes the input of the external microphone 300 over the input of the internal microphone 111. Therefore, the audio signal outputted by the digital video/audio processor 120 when step S603 is executed immediately after step S602 is a signal picked up by the external microphone 300. In step S603, the controller 130 displays the level meter 701, which shows the audio level outputted by the digital video/audio processor 120, over the through-image on the display component 190. That is, while the external microphone 300 is connected to the digital camera 100, the digital camera 100 displays the level meter 701 on the display component 190 regardless of the setting related to the selection and display of the audio level.

If it is determined in step S602 that the plug 303 has not been connected to the jack 203, that is, that the external microphone 300 has not been connected to the digital camera 100, then step S604 is executed. As discussed above, when the detector 202 detects that the plug 303 has not been connected to the jack 203, the analog audio processor 115 selects and processes the input of the internal microphone 111. Therefore, the audio signal outputted by the digital video/audio processor 120 when step S603 is executed immediately after step S604 is a signal picked up by the internal microphone 111. In step S604, the controller 130 refers to the settings for the digital camera 100 recorded to the ROM 170, and determines whether or not the setting for selecting and displaying the audio level is ON. If it is determined in step S604 that the setting for selecting and displaying the audio level is ON, then step S603 is executed. In step S603, the controller 130 displays on the display component 190 the level meter 701 showing the audio level outputted by the digital video/audio processor 120. If it is determined in step S604 that the setting for selecting and displaying the audio level is not ON, step S605 is executed. In step S605, the controller 130 does not display on the display component 190 the level meter 701 showing the audio level outputted by the digital video/audio processor 120. That is, in step S605, the controller 130 turns off the level meter 701 if the level meter 701 is currently being displayed on the display component 190, and does nothing if it is not being displayed. Once either the processing for displaying the level meter 701 in step S603 or the processing for not displaying the level meter 701 in step S605 ends, the operation of monitor display ends. That is, if the external microphone 300 is not connected to the digital camera 100, the digital camera 100 determines whether or not to display the level meter 701 on the display component 190 according to the setting made by the user.

FIG. 7 is a diagram of what is displayed on a display component 190. In imaging mode, the display component 190 displays the through-image outputted by the digital video/audio processor 120, and at the same time can display the level meter 701 that shows the audio level of the audio signal outputted by the digital video/audio processor 120. Whether or not to display the level meter 701 is decided by the controller 130 from the operation of monitor display shown in FIG. 6. If the flow moves to step S605 and the controller 130 decides not to display the level meter 701 on the display component 190 in the operation of monitor display shown in FIG. 6, then the level meter 701 is not displayed on the display component 190, as shown in FIG. 7A. If the flow moves to step S603 and the controller 130 decides to display the level meter 701 on the display component 190 in the operation of monitor display shown in FIG. 6, then the level meter 701 is displayed on the display component 190, as shown in FIG. 7B.

Whether the setting for selecting and displaying the audio level is ON or OFF is decided as follows. When the user does a predetermined operation such as pressing the center button 185, the digital camera 100 goes into a mode of receiving a change in the values of the various setting categories, and a menu screen is displayed on the display component 190. Next, the user does a predetermined operation such as pressing the cross key 186 to access the hierarchy at which the values for the setting categories related to the selecting and displaying of the audio level are managed. Then, the user performs another predetermined operation such as pressing the cross key 186 to switch the setting for selecting and displaying the audio level either ON or OFF. What is set by the user is stored in the ROM 170. That is, manipulation components 180 such as the cross key 186, the center button 185, and the like is unit for receiving the input for setting whether or not to display the level meter 701.

3. Conclusion

As discussed above, when the detector 202 detects that the external microphone 300 has been electrically connected to the digital camera 100, the controller 130 displays on the display component 190 the level meter 701 showing the audio level, regardless of the setting for selecting and displaying the audio level stored in the ROM 170. Consequently, the user can instantly (that is, in real time) check the audio level of the audio signal being picked up by the external microphone 300.

If the external microphone 300 is not picking up sound for some reason, such as a malfunction, then the level meter 701 showing the audio level will not move, so the user can instantly see that audio recording is impossible. Similarly, if the cable 302 breaks and the audio signal of the external microphone 300 is not being inputted to the digital camera 100, the user can instantly see that audio recording is impossible. Similarly, if the external microphone 300 is a type powered by a different battery from the battery housed in the digital camera 100 and there is no battery or the battery is dead, the user can instantly see that audio recording is impossible. Similarly, if the external microphone 300 is a type whose power is switched ON and OFF with a different power button from that of the digital camera 100 and the power is OFF, the user can instantly see that audio recording is impossible. As discussed above, the technology disclosed herein helps prevent the user from performing imaging without realizing that audio recording is impossible. Therefore, the user can reliably determine whether or not the digital camera 100 is in a state in which sound pickup with the external microphone 300 is possible.

Other Embodiments

The present technology is not limited to or by the above embodiment, and various embodiments are possible. Other embodiments of the present technology will be given below.

(1) In the above embodiment, the display on the display component 190 of the level meter 701 showing the audio level of the audio signal was given as the information indicating the input state of the audio signal, but how the information indicating the input state of the audio signal is displayed is not limited to this. For example, the information indicating the input state of the audio signal may be information such that an icon indicating that audio is being inputted is always displayed except when there is no sound.

(2) In the above embodiment, the digital camera 100 had a configuration in which the lens barrel 141 was fixed, but the lens barrel 141 may instead be interchangeable with respect to the digital camera 100.

(3) In the above embodiment, the external microphone 300 was mechanically fixed to the shoe 201, but there is no need for the external microphone 300 to be fixed to the shoe 201 or to the digital camera 100, during sound pickup with the external microphone 300, and what matters is that the external microphone 300 can be electrically connected to the digital camera 100, and the audio signals picked up by the external microphone 300 can be inputted to the digital camera 100.

(4) In the above embodiment, the audio signals picked up by the external microphone 300 were inputted to the digital camera 100 via the electrically connected plug 303 and jack 203, but this may be changed as follows.

Specifically, the shoe 201 is equipped with a terminal for electrical connection. The external microphone 300 is electrically connected to this terminal when it is mechanically fixed to the shoe 201. The external microphone 300 inputs an audio signal to the digital camera 100 via this terminal. The detector 202 detects that the external microphone 300 has been mechanically fixed (connected) to the 201, or has been electrically connected to this terminal.

(5) In the above embodiment, the external microphone 300 was connected by wire to the digital camera 100. However, the external microphone 300 does not have to input audio signals to the digital camera 100 by wire, and may input them by wireless connection. In this case, the external microphone 300 is equipped with a microphone-side communication component, for example. The audio input system 110 is equipped with a camera-side communication component (an example of a connection unit). When wireless connection is established between the microphone-side communication component and the camera-side communication component, the digital camera 100 starts receiving the audio signal picked up by the external microphone 300. Also, when wireless connection is established, the detector 202 detects that the external microphone 300 has been connected to the digital camera 100. Subsequent processing is the same as in the above embodiment.

(6) In the above embodiment, the digital video/audio processor 120 and the controller 130 were described as each having their own functions and configuration as discussed above, but some of the functions and configuration of each may be included in the other.

(7) In the above embodiment, the CCD image sensor 143 was described as an example of an imaging element, but the present technology is not limited to this. Specifically, a CMOS image sensor, an NMOS image sensor, or another imaging element can also be applied to the present technology.

(8) In the above embodiment, an example of applying the present technology to the digital camera 100 was described, but as long as audio signals can be handled, the present technology can also be applied to a device that cannot handle image information. For example, the present technology can be similarly applied to an audio recording device such as a voice recorder that has an internal microphone and can be connected to an external microphone. Also, the present technology can be similarly applied to an audio recording device that is not equipped with an internal microphone.

(9) In the above embodiment, the display component 190 was a liquid crystal display, but the present technology is not limited to this. The display component 190 may instead be an LED lamp, for example. The input state of audio signals may be indicated by the number of times the LED lamp lights, its color, and so on.

(10) In the above embodiment, as shown in the flowcharts of FIGS. 5 and 6, once the plug 303 of the external microphone 300 was connected to the jack 203 of the digital camera 100, the level meter 701 continued to be displayed as long as those components were not disconnected, but the present technology is not limited to this. For example, the design may be such that when the plug 303 is connected to the jack 203, the level meter 701 is temporarily displayed on the display component 190, after which the user can manually turn off the level meter 701. In this case, if the plug 303 is reconnected to the jack 203 after the user has manually turned off the level meter 701, it is preferable that the level meter 701 is designed to be displayed again on the display component 190. In other words, even if the display can be cancelled every time the plug 303 is connected to the jack 203, it is preferable for the level meter 701 to be displayed at least once on the display component 190.

INDUSTRIAL APPLICABILITY

With the technology disclosed herein, the user can reliably determine whether or not an audio recording device is in a state in which sound pickup with an external microphone is possible. Therefore, the technology disclosed herein can be applied not only to a digital camera, but also to a movie camera, a portable telephone, a voice recorder, or any other of various audio recording devices that record audio data by using an external microphone.

General Interpretation of Terms

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of the audio recording device and the imaging device. Accordingly, these terms, as utilized to describe the present invention should be interpreted relative to the audio recording device and the imaging device.

The term "configured" as used herein to describe a component, section, or part of a device implies the existence of other unclaimed or unmentioned components, sections, members or parts of the device to carry out a desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

REFERENCE SIGNS LIST 100 digital camera
110 audio input system
111 internal microphone
115 analog audio processor
120 digital video/audio processor
130 controller
140 image input system
141 lens barrel
142 lens controller
143 CCD image sensor
150 RAM
160 external storage medium
170 ROM
180 manipulation components
181 release button
182 zoom lever
183 power switch
184 mode dial
185 center button
186 cross key
190 display component
195 speaker 200 flash
202 detector
203 jack
210 microphone hole
300 external microphone
301 pickup component
302 cable
303 plug

The invention claimed is:

1. An audio recording device, comprising:
   an audio input unit including a connection unit configured to connect with an external pickup device, and an audio receive unit configured to receive an input of an audio signal from the external pickup device;
   a detect unit configured to detect the connection between the connection unit and the external pickup device;
   an internal pickup device;
   a setting unit configured to receive an input of a setting indicating whether or not to display information of an input state of the audio signal from the external pickup device or the internal pickup device; and
   a control unit configured to display the information of the input state of the audio signal from the external pickup device regardless of the setting while the external pickup device is connected with the connection unit, not only in a case that the setting unit receives the input indicating a display of the information, but also in a case that the setting unit receives the input indicating a non-display of the information,
   wherein the control unit is configured to display the information of the input state of the audio signal from the internal pickup device according to the setting while the external pickup device is not connected with the connection unit.

2. The audio recording device according to claim 1, further comprising
   a display unit, wherein
   the control unit is configured to display information indicating the input state of the audio signal from the external pickup device or the internal pickup device on the display unit.

3. The audio recording device according to claim 1, wherein
   the information indicating the input state of the audio signal from the external pickup device or the internal pickup device includes information indicating an audio level of the audio signal picked up by the external pickup device or the internal pickup device, respectively.

4. The audio recording device according to claim 1, wherein
   the detect unit is configured to detect an connection for communication between the connection unit and the external pickup device.

5. An imaging device, comprising:
   an audio input unit including a connection unit configured to connect with an external pickup device, and an audio receive unit configured to receive an input of an audio signal from the external pickup device;
   a detect unit configured to detect the connection between the connection unit and the external pickup device;
   an internal pickup device;
   a setting unit configured to receive an input of a setting indicating whether or not to display information of the input state of the audio signal from the external pickup device or the internal pickup device; and
   a control unit configured to display the information of the input state of the audio signal from the external pickup device regardless of the setting while the external pickup device is connected with the connection unit, not only in a case that the setting unit receives the input indicating a display of the information but also in a case that the setting unit receives the input indicating a non-display of the information,
   wherein the control unit is configured to display the information of the input state of the audio signal from the internal pickup device according to the setting while the external pickup device is not connected with the connection unit.

6. The audio recording device according to claim 1, wherein
   the control unit is configured to change display of the information of the input state of the audio signal from the external pickup device to non-display of the information by a user operation after displaying the information of the input state of the audio signal from the external pickup device.

7. The imaging device according to claim 1, wherein
   the control unit is configured to change display of the information of the input state of the audio signal from the external pickup device to non-display of the information by a user operation after displaying the information of the input state of the audio signal from the external pickup device.

* * * * *